M. VANBIBBER.
Harrow.
No. 98,531.
Patented Jan. 4, 1870
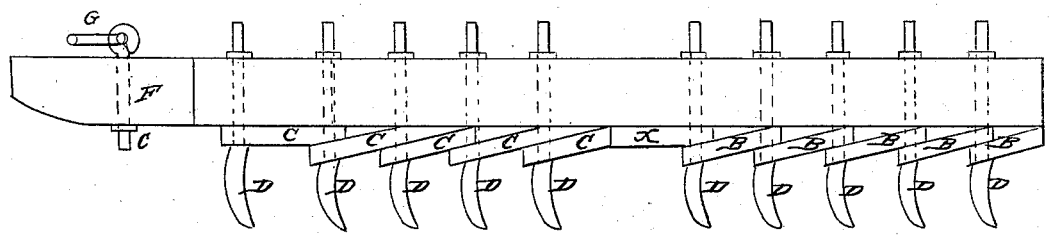
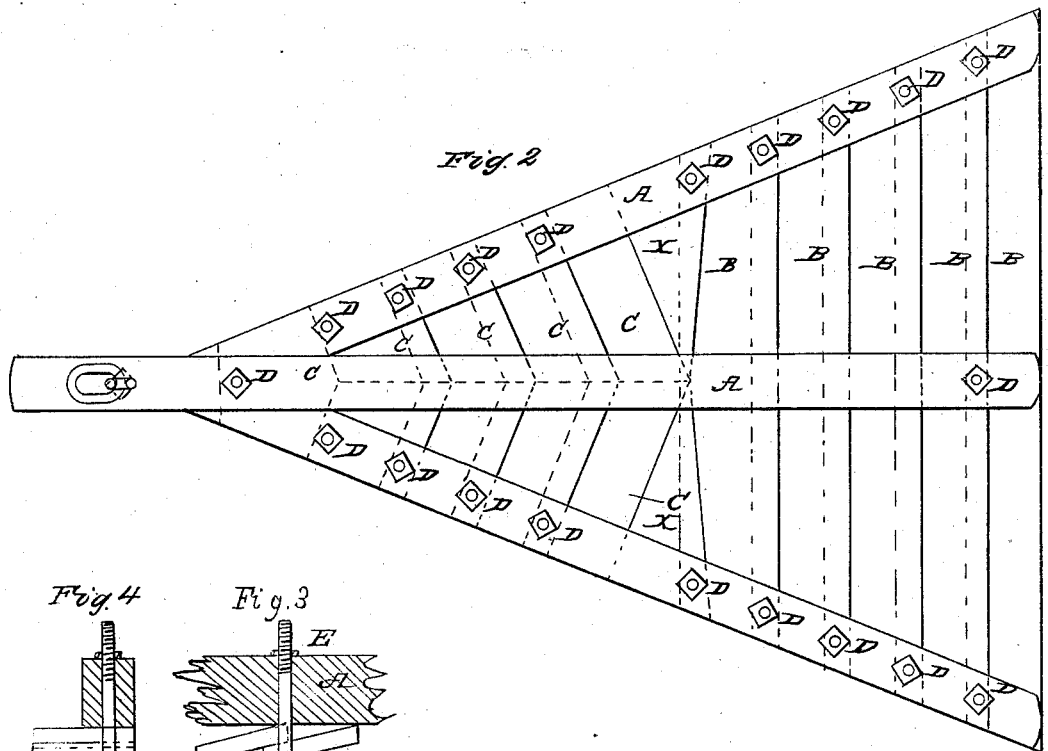
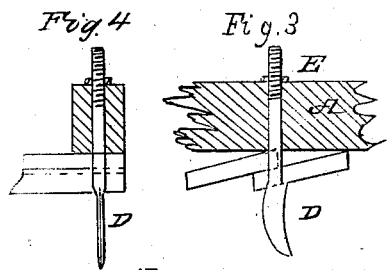
Witnesses
S. K. Yocum
Thos. Yocum
Inventor
Merrit Vanbibber

UNITED STATES PATENT OFFICE.

MERRIT VANBIBBER, OF TIPTON, INDIANA.

IMPROVEMENT IN HARROWS.

Specification forming part of Letters Patent No. 98,531, dated January 4, 1870.

*To all whom it may concern:*

Be it known that I, MERRIT VANBIBBER, of Tipton, in the county of Tipton and State of Indiana, have invented certain new and useful Improvements in Harrows, which I have described in the following specification, and illustrated in the accompanying drawings, with sufficient clearness to enable others of competent skill to make and use my invention.

My invention consists in the arrangement and combination of parts hereinafter described, by which I construct my harrow, so that it will pulverize the soil, either loam or sward, and answer for covering corn or other grain.

I construct my harrow in a triangular shape, as shown at Figure 2. I take three pieces of timber four inches square, and any desired length, the center-piece being longer than the side pieces. I firmly attach the side pieces, at the point or near it, to the center-piece. Fig. 2 is a horizontal view of frame A A A, which I cover with plank one inch in thickness and ten inches wide, except the first one, which I fasten firmly on the frame A A A, at the point where the three pieces A A A are joined, as shown at Fig. 1, in the drawing, which is wider, on account of the front edge being straight; also, the fifth plank C, as shown at Fig. 1, which is required to be wider at each end, or small pieces X X may be inserted, so as to cover tightly. The planks C C C C C cover about half the frame in length, and straight planks B B B B B cover the other half. The planks C C C C C are cut angular, or they may be mitered in the center, and of two pieces, as shown at Fig. 1 in the drawing. After nailing the shortest plank C to frame A A A, I place the front edge of each succeeding plank on the top of the last one, until all are nailed onto frame A A A.

Cutter D, as shown at Fig. 3, needs but little explanation. They are all sharp on the full or front edge, and being wide below, and nut E above, they are readily tightened. The offset between the wide and narrow part presses tight on the plank, while the nut E is made tight on the opposite side. I put one cutter D through the first plank C, so that it passes through the front edge or near it, and through the center-piece of frame A A A, and one cutter D through the straight plank on the hind end and near the edge, so as to pass through two thicknesses of plank and the center-piece of frame A A A. I also put one cutter through the two thicknesses of plank at each end, so that they pass through the side pieces of A A A frame.

I thus have eleven cutters in my harrow—one in the middle in front, and one in the center behind, and nine on each side, all as shown at Fig. 3 of the drawings, and marked D. I also have a bolt, F, and link $g$, as shown at Fig. 4 of drawings, the top of the bolt being a ring, and nut E to tighten; but any other fastening may answer to draw the harrow by.

Having thus fully described my invention, the nature of its operation is as follows: I place the harrow so that the cutters D D D D D D D D D D D may operate on the soil, and when in motion the cutters D D D D D D D D D D D will cut in small strips sward that has been turned without turning it, as the covered surface above keeps its down, and the angular plank on the front part gathers the dirt or soil toward the center of the harrow, and thus heaps it in a row, and by this operation it covers corn and other grain, while the straight planks B B B B B crush and pulverize the lumps or clods, the whole forming a corrugated surface to operate on the soil so far as to completely pulverize and level it, as desired.

I do not claim the frame A A A, or the fastening by which it is drawn, neither the cutters separate; but What I do claim, and desire to secure by Letters Patent, is—

The planks C C C C C of angular shape, combined with straight planks B B B B B, all forming a peculiar corrugated surface, as described, and in combination with cutters D D D D D D D D D D, substantially as herein set forth, and for the purposes specified.

MERRIT VANBIBBER.

Witnesses:
S. H. YOCUM,
JAMES M. KINNAMAN.